US012221971B1

(12) United States Patent
Menheere et al.

(10) Patent No.: US 12,221,971 B1
(45) Date of Patent: Feb. 11, 2025

(54) BLEED VALVE ASSEMBLY FOR AIRCRAFT ENGINES

(71) Applicant: PRATT & WHITNEY CANADA CORP., Longueuil (CA)

(72) Inventors: David Menheere, Norval (CA); Andrew Marshall, Grand Valley (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/525,046

(22) Filed: Nov. 30, 2023

(51) Int. Cl.
*F04D 27/02* (2006.01)
*F02C 6/08* (2006.01)

(52) U.S. Cl.
CPC ............ *F04D 27/0215* (2013.01); *F02C 6/08* (2013.01); *F04D 27/023* (2013.01); *F05D 2220/323* (2013.01)

(58) Field of Classification Search
CPC .......... F02C 9/18; F02C 6/08; F04D 27/0215; F04D 27/023; F05D 2260/60; F02K 3/075
See application file for complete search history.

(56) References Cited

U.S. PATENT DOCUMENTS

| | | | | |
|---|---|---|---|---|
| 3,360,189 A * | 12/1967 | Cook | ..................... | F01D 17/105 415/144 |
| 4,574,585 A * | 3/1986 | Conn | .................. | F04D 27/0223 415/27 |
| 6,755,025 B2 * | 6/2004 | Eleftheriou | ........... | F04D 27/023 60/795 |
| 7,540,144 B2 * | 6/2009 | Makuszewski | ....... | F04D 27/023 60/785 |
| 7,555,905 B2 * | 7/2009 | Borcea | ..................... | F02C 6/08 60/770 |
| 8,858,164 B2 * | 10/2014 | Colotte | .................... | F02K 3/075 251/83 |
| 9,651,053 B2 * | 5/2017 | Eleftheriou | ........... | F01D 17/105 |
| 9,657,647 B2 * | 5/2017 | Mackin | ................. | F04D 27/009 |
| 10,473,036 B2 * | 11/2019 | Little | ......................... | F02C 9/18 |
| 11,149,653 B2 * | 10/2021 | Catherall | .................. | F02C 6/08 |

(Continued)

FOREIGN PATENT DOCUMENTS

| | | | | |
|---|---|---|---|---|
| CA | 2564677 A1 * | 4/2007 | ................ | F02C 9/18 |
| CA | 3077741 A1 * | 11/2020 | ............. | B64D 13/06 |

(Continued)

*Primary Examiner* — Craig Kim
(74) *Attorney, Agent, or Firm* — NORTON ROSE FULBRIGHT CANADA LLP

(57) ABSTRACT

A compressor has: a rotor and a shroud having a internal and external sides and an air outlet; an annular case mounted to the external side and enclosing a plenum, the annular case having inner and outer sides and defining an aperture; a valve mounted to the annular case at the aperture and having: a support secured to the annular case and defining a seat surrounding a bleed passage, the seat located on the outer side, the support defining a guiding aperture, and a valve member having a head and a stem slidably received within the guiding aperture, the valve member having a closed position and an open position, the head abutting the valve seat in the closed position and offset from the valve seat in the open position; and an actuator engaged to the valve member for moving the valve member between the closed position and the open position.

17 Claims, 7 Drawing Sheets

(56) References Cited

U.S. PATENT DOCUMENTS

| | | | |
|---|---|---|---|
| 2004/0016238 A1* | 1/2004 | Eleftheriou | F04D 27/023 |
| | | | 60/785 |
| 2005/0019156 A1* | 1/2005 | D'Angelo | F01D 17/105 |
| | | | 415/144 |
| 2007/0089429 A1* | 4/2007 | Makuszewski | F04D 27/023 |
| | | | 60/785 |
| 2007/0241257 A1* | 10/2007 | Eleftheriou | F02K 3/06 |
| | | | 248/554 |
| 2010/0083667 A1* | 4/2010 | Franconi | G05D 7/014 |
| | | | 251/28 |
| 2011/0097196 A1* | 4/2011 | Colotte | F04D 27/0215 |
| | | | 415/145 |
| 2015/0027130 A1* | 1/2015 | LeBlanc | F02C 9/18 |
| | | | 60/785 |
| 2018/0223741 A1* | 8/2018 | Little | F02C 3/04 |
| 2018/0252184 A1* | 9/2018 | Hatim | F02K 3/075 |
| 2019/0101061 A1* | 4/2019 | DiBenedetto | F01D 17/105 |
| 2019/0309762 A1* | 10/2019 | Caratge | F04D 27/0215 |
| 2019/0360598 A1* | 11/2019 | Kelly | F04D 27/0215 |
| 2020/0043641 A1* | 2/2020 | Butcka | F16K 31/0675 |
| 2020/0386115 A1* | 12/2020 | Little | F02C 6/08 |
| 2024/0110518 A1* | 4/2024 | Miller | F02C 6/08 |

FOREIGN PATENT DOCUMENTS

| | | | | |
|---|---|---|---|---|
| EP | 3748147 A1 * | 12/2020 | | F01D 17/141 |
| GB | 1145819 | 3/1969 | | |

* cited by examiner

BLEED VALVE ASSEMBLY FOR AIRCRAFT ENGINES

TECHNICAL FIELD

The disclosure relates generally to pressure control systems of aircraft engines, such as gas turbine engines and, more particularly, to bleed valves for such systems.

BACKGROUND

Bleed valves may be used for various functions in aircraft engines, one example of which being the control of compressor operation by opening and closing to regulate flow and to control surge and stall characteristics. Existing bleed valves, such as variable bleed valves, include complicated actuation mechanisms having a plurality of moving parts. These moving parts may require regular maintenance to ensure adequate function, limit leaks and/or control their integrity. These moving parts may further be bulky and take up valuable space in restrained areas of the aircraft engine. While existing bleed valves may be suitable for their intended purposes, improvements are nonetheless sought.

SUMMARY

In one aspect, there is provided a compressor for an aircraft engine, comprising: a rotor rotatable about a central axis; a shroud disposed around the rotor and surrounding a gaspath, the shroud having a internal side facing the rotor and an external side opposite the internal side, the shroud defining an air outlet extending through the shroud from the internal side to the external side; an annular case extending around the central axis and mounted to the external side of the shroud radially outward of the air outlet, the annular case enclosing a plenum fluidly connected to the gaspath within the shroud via the air outlet extending through the shroud, the annular case having an inner side facing the external side of the shroud and an outer side opposite the inner side, the annular case defining an aperture extending from the inner side to the outer side; a valve mounted to the annular case at the aperture, the valve having: a valve support secured to the annular case and defining a valve seat surrounding a bleed passage, the valve seat located on the outer side of the annular case, the valve support defining a guiding aperture, and a valve member having a valve head and a valve stem protruding from the valve head and slidably received within the guiding aperture, the valve member having a closed position and an open position, the valve head abutting the valve seat in the closed position and offset from the valve seat in the open position; and an actuator engaged to the valve member, the actuator configured for moving the valve member between the closed position and the open position.

The compressor may include any of the following features, in any combinations.

In some embodiments, the valve support includes an outer ring secured to a peripheral wall of the aperture and an inner ring secured to the outer ring via a rib, the bleed passage defined between the inner ring and the outer ring, the inner ring circumscribing the guiding aperture.

In some embodiments, a biasing member is disposed between the valve head and the valve support, the biasing member exerting a biasing force on the valve head to bias the valve head in the open position.

In some embodiments, the biasing member is disposed around the valve stem.

In some embodiments, the valve member moves away from the plenum from the closed position to the open position.

In some embodiments, the actuator is a solenoid including a coil extending around the valve stem.

In some embodiments, the valve support includes an inner ring defining the guiding aperture, the coil secured to the inner ring and disposed around the guiding aperture.

In some embodiments, the actuator is engaged to the valve member via a band, the band overlapping the valve head, the actuator configured to increase a tension in the band to move the valve head radially inwardly towards the central axis.

In some embodiments, opposite end sections of the band are wrapped around respective spools each engaged by a respective one of a first gear and a second gear meshed with the first gear, the actuator engaged to a lever driving the first gear to selectively tighten or loosen the band.

In some embodiments, the aperture includes a plurality of apertures circumferentially distributed around the central axis, the valve including a plurality of valves each secured to the annular case at a respective one of the plurality of apertures.

In another aspect, there is provided an aircraft engine, comprising: a compressor having a rotor rotatable about a central axis and a shroud disposed around the rotor, the shroud having an internal side facing the rotor and an external side opposite the internal side, the shroud defining an air outlet extending through the shroud from the internal side to the external side; and a bleed valve assembly having: an annular case enclosing a plenum radially outward of the shroud, the plenum being fluidly connected to a gaspath of the aircraft engine via the air outlet, the annular case having an inner side facing the central axis and an outer side opposite the inner side, the annular case defining apertures extending from the inner side to the outer side; and commonly-actuated valves mounted to the annular case at the aperture, the commonly-actuated valves having valve members and valve supports, the valve supports secured to the annular case and defining valve seats surrounding bleed passages, the valve seats located on the outer side of the annular case, the commonly-actuated valves having an open configuration in which the valve members are offset from the valve seats and a closed configuration in which the valve members abut the valve seats; and an actuating system operatively connected to the commonly-actuated valves, the actuating system having a powered configuration to conjointly move all of the commonly-actuated valves from the open configuration towards the closed configuration.

The aircraft engine may include any of the following features, in any combinations.

In some embodiments, the valve supports include outer rings secured to peripheral walls of the apertures and inner rings secured to the outer rings via ribs, the bleed passages defined between the inner rings and the outer rings.

In some embodiments, the inner rings are circumscribing guiding apertures slidably receiving valve stems of the valve members.

In some embodiments, biasing members are disposed between valve heads of the valve members and the valve supports, the biasing members exerting biasing forces on the valve heads to bias the valve heads away from the valve seats.

In some embodiments, the biasing members are disposed around valve stems of the valve members, the valve heads secured to the valve stems.

In some embodiments, the valve members move away from the plenum from the closed configuration of the valves to the open configuration of the valves.

In some embodiments, the actuating system includes solenoids having coils extending around the valve members.

In some embodiments, the coils are secured to the inner rings and disposed around the guiding apertures.

In some embodiments, the actuating system includes an actuator engaged to the valve members via a band, the band overlapping the valve members, the actuator configured to increase a tension in the band to move the valve members radially inwardly towards the central axis.

In some embodiments, opposite end sections of the band are wrapped around respective spools each engaged by a respective one of a first gear and a second gear meshed with the first gear, the actuator engaged to a lever driving the first gear to selectively tighten or loosen the band.

BRIEF DESCRIPTION OF THE DRAWINGS

Reference is now made to the accompanying figures in which.

DETAILED DESCRIPTION

Figure 1:
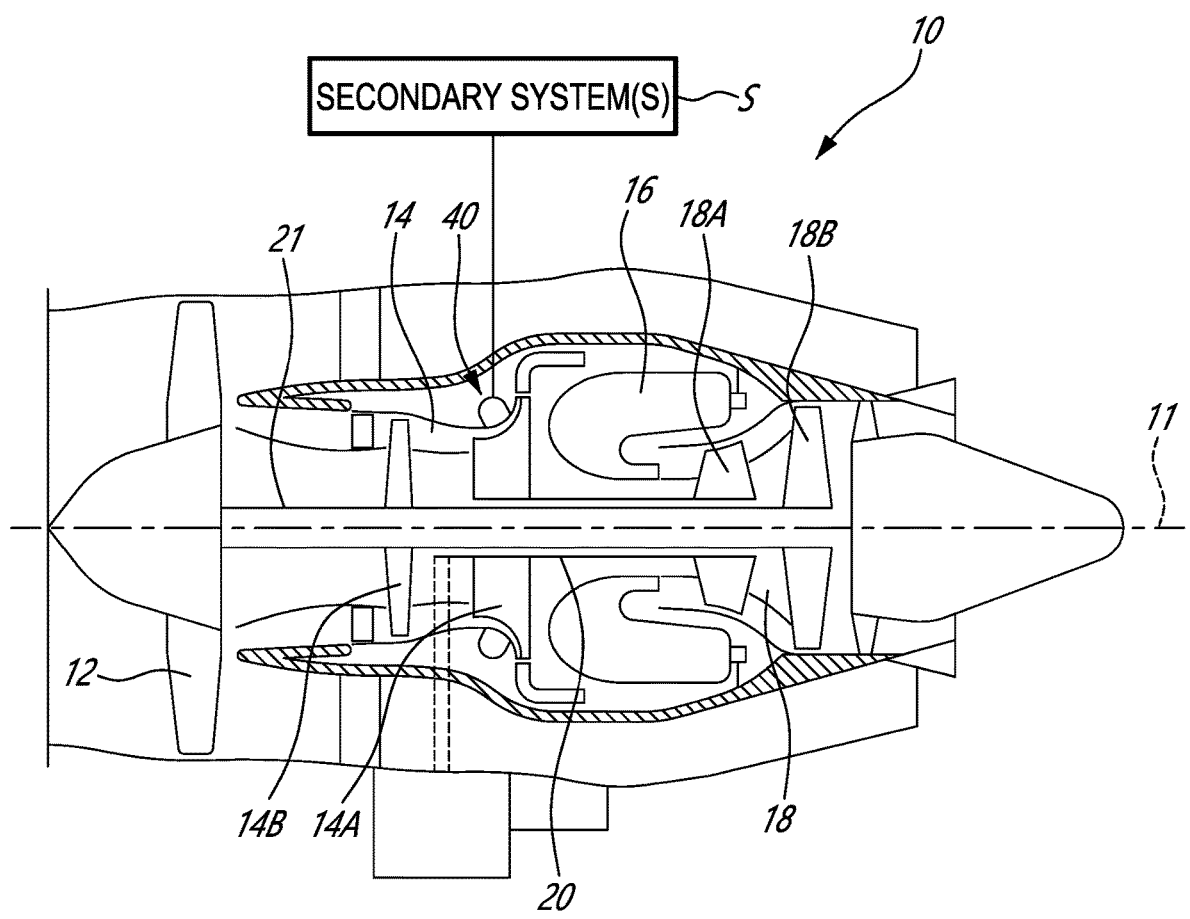
FIG. 1 is a schematic cross-sectional view of an aircraft engine depicted as a gas turbine engine.

FIG. 1 illustrates an aircraft engine depicted as a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The fan 12, the compressor section 14, and the turbine section 18 are rotatable about a central axis 11 of the gas turbine engine 10. In the embodiment shown, the gas turbine engine 10 comprises a high-pressure spool having a high-pressure shaft 20 drivingly engaging a high-pressure turbine 18A of the turbine section 18 to a high-pressure compressor 14A of the compressor section 14, and a low-pressure spool having a low-pressure shaft 21 drivingly engaging a low-pressure turbine 18B of the turbine section to a low-pressure compressor 14B of the compressor section 14 and drivingly engaged to the fan 12.

It will be understood that the contents of the present disclosure may be applicable to any suitable aircraft engines, such as turboprops and turboshafts, and reciprocating engines, such as piston and rotary engines without departing from the scope of the present disclosure.

Figure 2:
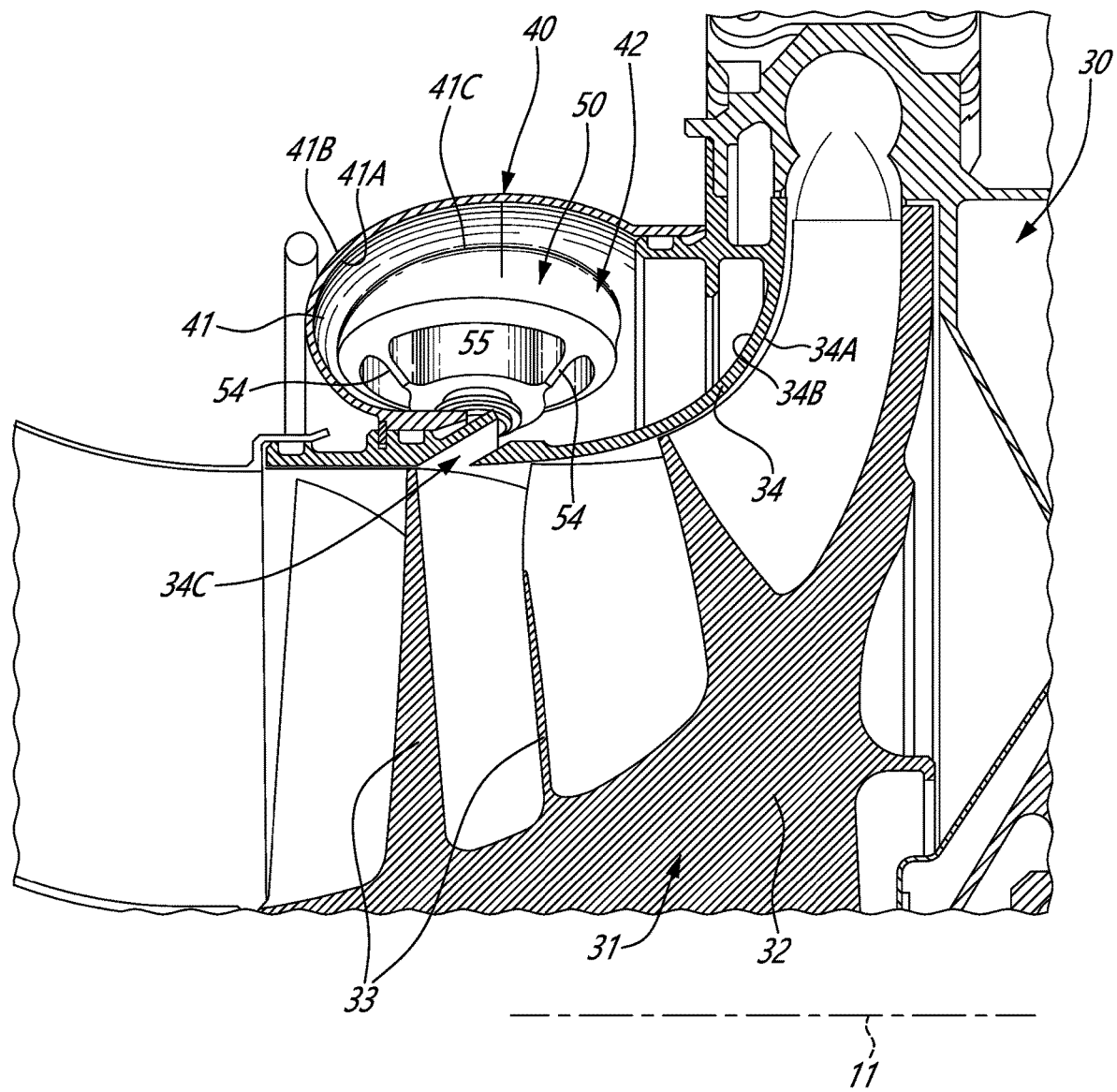
FIG. 2 is a cutaway view illustrating a portion of a compressor of the gas turbine engine of FIG. 1.

Referring to FIG. 2, a high-pressure compressor is referred to at 30 and may correspond to the high-pressure compressor 14A described above with reference to FIG. 1. The high-pressure compressor 30 includes an impeller 31 rotatable about the central axis 11. It will be appreciated that the high-pressure compressor 30 may be an axial compressor instead of a centrifugal compressor. The impeller 31 includes a hub 32 and blades 33 protruding from the hub 32 and distributed around the central axis 11. A shroud 34 extends annularly around the central axis 11 and is disposed around the impeller 31. The impeller 31 defines flow passages interspaced between the blades 33. The flow passages extend substantially axially at an inlet of the impeller 31 and extend substantially radially at an outlet of the impeller 31. In some configurations, it may be desired to extract compressed air from the high-pressure compressor 30 to feed secondary systems S (FIG. 1) in need of compressed air. These secondary systems S may include, for instance, environmental control system of an aircraft, bearing cavities in need of compressed air for proper sealing, actuators, and so on.

In the embodiment shown, the shroud 34 has a internal side 34A facing the impeller 31 and a external side 34B opposite the internal side 34A and facing away from the impeller 31. The shroud 34 defines an air outlet 34C extending from the internal side 34A to the external side 34B. The air outlet 34C is configured to allow a bleed flow of air to leave a gaspath of the high-pressure compressor 30 to feed the secondary systems S (FIG. 1). The air outlet 34C may be one or more apertures defined through the shroud 34. The air outlet 34C may be elongated openings (e.g., slits) defined through the shroud 34. As shown in FIG. 2, the air outlet 34C is angled in a direction of the flow in the gaspath. This may facilitate air extraction while minimizing drag. The air outlet 34C is upstream of an outlet of the high-pressure compressor 30.

Still referring to FIG. 2, in the embodiment shown, the high-pressure compressor 30 is equipped with a bleed valve assembly 40 that is configured to selectively allow the air extracted from the gaspath to reach the secondary systems S or to prevent said air to reach the secondary systems S. The bleed valve assembly 40 may also be able to vary a mass flow rate of the air flowing from the high-pressure compressor 30 to the secondary systems S.

In the embodiment shown, the bleed valve assembly 40 includes an annular case 41 extending around the central axis 11 and enclosing a plenum 42 fluidly connectable to the high-pressure compressor 30, herein via the air outlet 34C. The annular case 41 is secured to the external side 34B of the shroud 34 and is disposed radially outward of the air outlet 34C. The annular case 41 has an inner side 41A facing the plenum 42 and an outer side 41B opposite the inner side 41A. The inner side 41A is exposed to air contained within the plenum 42. The annular case 41 defines apertures 41C extending from the inner side 41A to the outer side 41B. In the present embodiment, the apertures 41C include a plurality of apertures distributed around the central axis 11, but any number of apertures, such as a single aperture, may be used without departing from the scope of the present disclosure.

Figure 3:
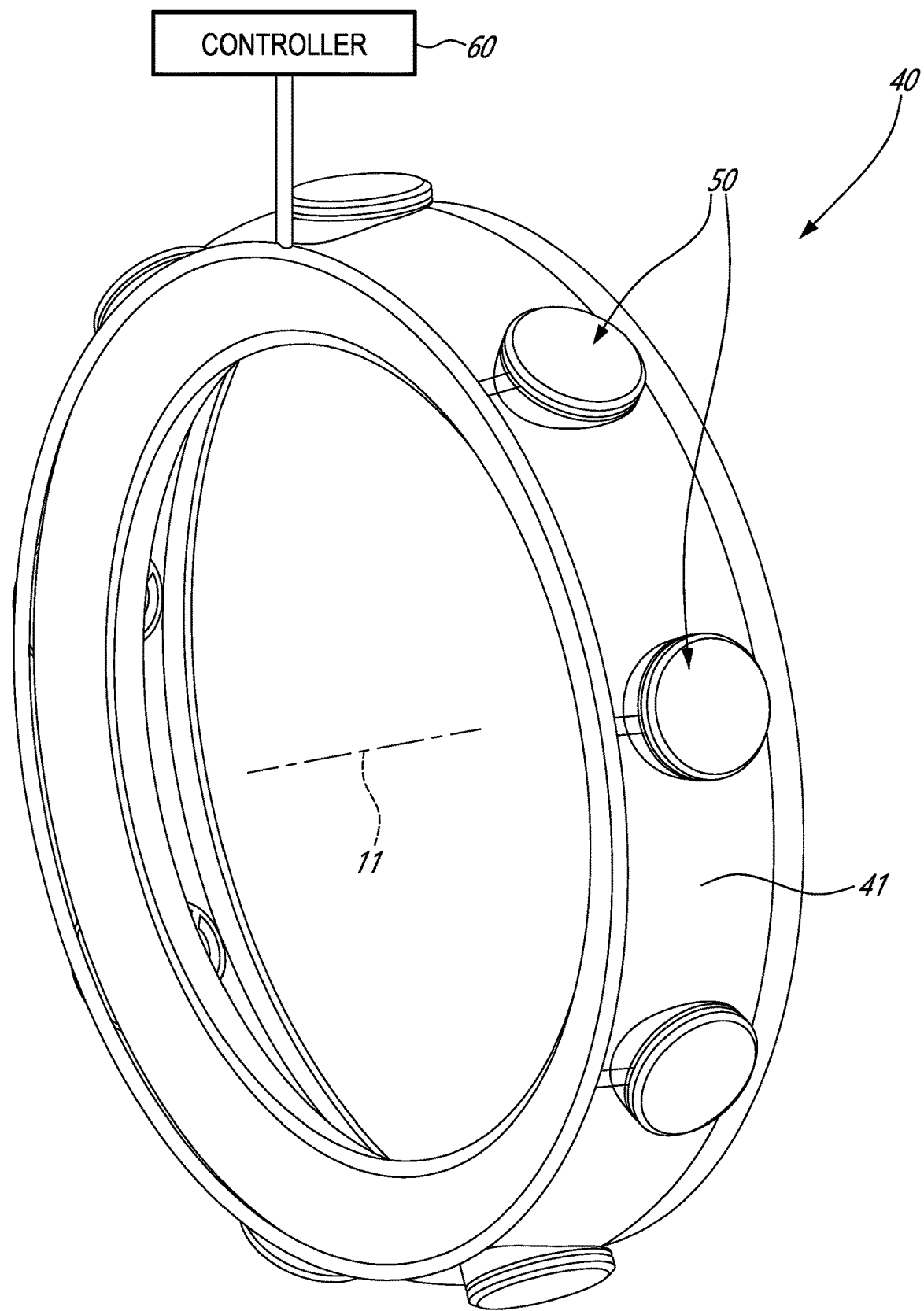
FIG. 3 is a three dimensional view of a bleed valve assembly in accordance with one embodiment for the compressor of FIG. 2.

Referring to FIGS. 2-3, the bleed valve assembly 40 further includes valves 50 for selectively allowing the compressed to leave the plenum 42 or to prevent the air from leaving the plenum 42. The valves 50 are each operatively connected to a respective one of the apertures 41C of the annular case 41. The valves 50 are operatively connected to a controller 60 that is operable to cause the valves 50 to open or close depending of a need of compressed air of the secondary systems S. The valves 50 are described below using the singular form, but the description below may apply to each of the valves 50.

Figure 4:
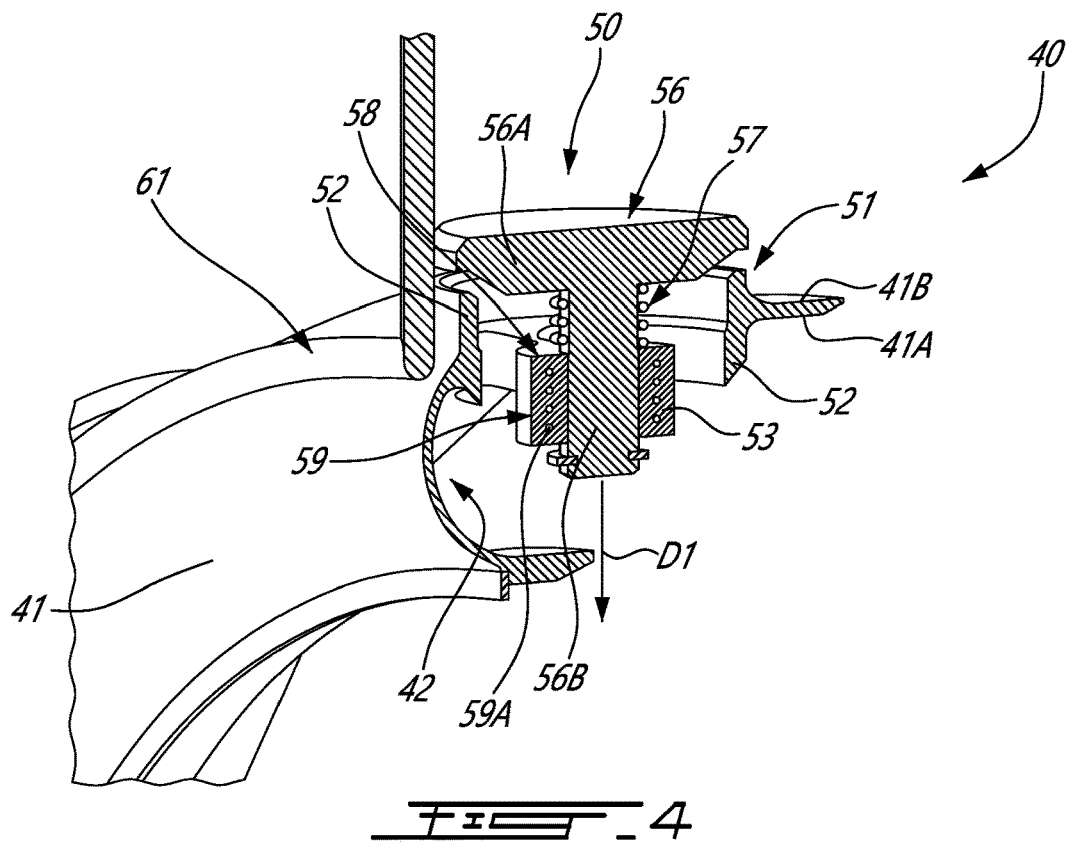
FIG. 4 is a cutaway view of the bleed valve assembly of FIG. 3 taken on a plane containing a central axis of the gas turbine engine of FIG. 1.
Figure 5:
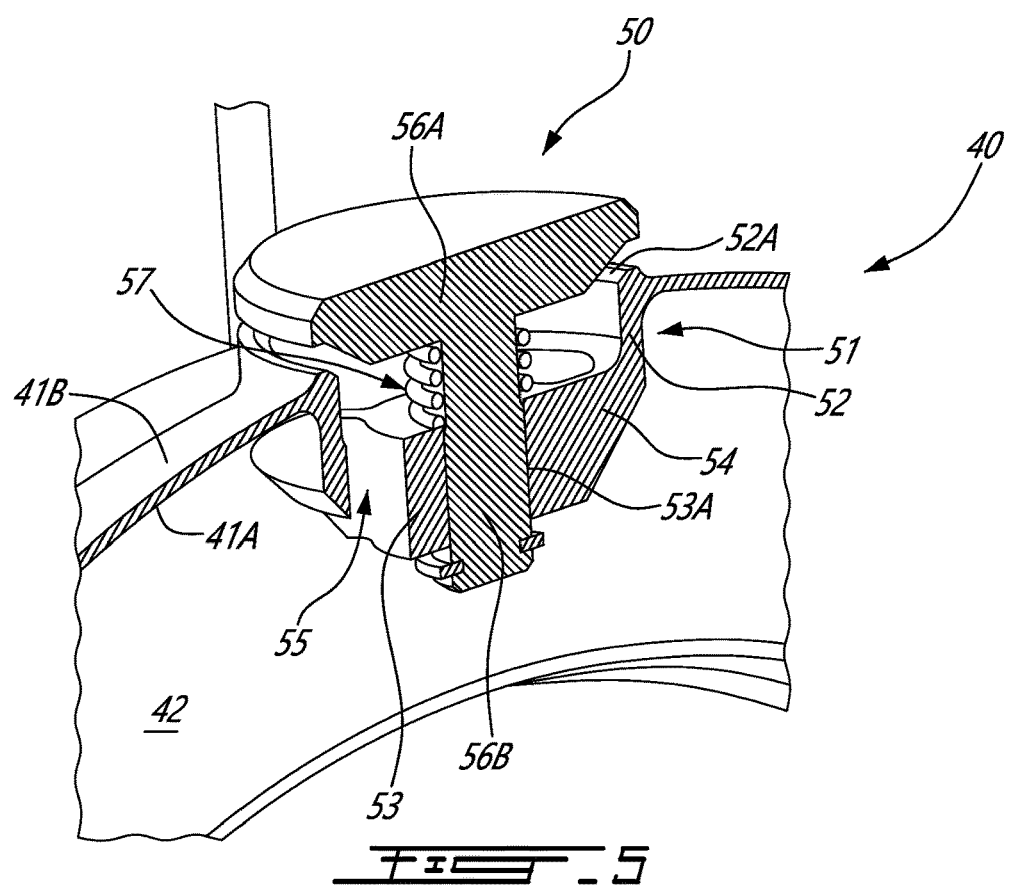
FIG. 5 is a cutaway view of the bleed valve assembly of FIG. 3 taken on a plane normal to the central axis of the gas turbine engine of FIG. 1.

Referring to FIGS. 3-5, the valve 50 has a valve support 51 secured to the annular case 41 at a respective one of the apertures 41C. The valve support 51 includes an outer ring 52 and an inner ring 53 secured to the outer ring 52 via ribs 54. The outer ring 52 is secured to a peripheral wall of the respective one of the apertures 41C. The outer ring 52 is disposed around the inner ring 53 and the ribs 54 extends radially from the inner ring 53 to the outer ring 52. Although more than one ribs 54 is shown, only one rib may be used in some embodiments. The outer ring 52 defines a valve seat 52A. The inner ring 53 defines a guiding aperture 53A. The inner ring 53 thus circumscribes the guiding aperture 53A. The valve support 51 defines bleed passages 55 in fluid communication with the plenum 42. The bleed passages 55 extend between the inner ring 53 and the outer ring 52 and are interspaced between the ribs 54. The valve seat 52A is located on the outer side 41B of the annular case 41. Put differently, the valve seat 52A is oriented away from the central axis 11.

It will be appreciated that the valve supports 51 may be integrated with the annular case 41. More specifically, the valve supports 51 and the annular case 41 may be parts of a single monolithic body. Alternatively, the valve supports 51 may be secured (e.g., welded) to the annular case 41.

Still referring to FIGS. 4-5, the valve 50 further includes a valve member 56 having a valve head 56A and a valve stem 56B protruding from the valve head 56A and being slidably received within the guiding aperture 53A of the inner ring 53. The valve stem 56B is therefore movable within the guiding aperture 53A along its longitudinal axis. The valve member 56 has a closed position depicted in FIG. 3 and an open position depicted in FIGS. 4-5. The valve head 56A is abutting the valve seat 52A in the closed position and is offset from the valve seat 52A in the open position. Put differently, the valves 50 have an open configuration in which the valve member 56 is offset from the valve seat 52A and a closed configuration in which the valve member 56 abuts the valve seat 52A. A retaining ring may be secured to the valve stem 56B to prevent the valve stem 56B from leaving the guiding aperture 53A.

A biasing member 57 is engaged to the valve head 56A and to the valve support 51 to bias the valve member 56 in the open position. The biasing member 57 may be a spring coiled around the valve stem 56B and disposed axially between the inner ring 53 and the valve head 56A relative to the longitudinal axis of the valve stem 56B. The biasing member 57 is used such that an at rest or default position of the valve member 56 corresponds to the open position. Moreover, by having the valve seat 52A and the valve head 56A on the outer side of the annular case 41 allows a pressure of the air in the plenum 42 to exert a force to move the valve in the open position. Therefore, the secondary systems S may always receive a flow of bleed air even if the valve malfunctions.

In the embodiment shown, an actuating system is operatively connected to the valves 50. The valves 50 may be commonly-actuated by the actuating system. In some configurations, the actuating system has a powered configuration to conjointly move all of the valves 50 from the open configuration towards the closed configuration.

In the present embodiment, the actuating system includes an actuator 58. The actuator 58 is engaged to the valve member 56 and is operable to move the valve member 56 between the open and closed positions. The actuator 58 is, in the present embodiment, a solenoid 59 including a coil 59A wrapped around the valve stem 56B. The coil 59A may be embedded or integrated in the inner ring 53. A conductor 61 is used to carry power to the coil 59A of the solenoid 59 to selectively power the solenoid 59. The conductor 61 is used to operatively connected the actuator 58 to the controller 60. In the embodiment shown, the powering of the coil 59A translates into a magnetic force exerted on the valve stem 56B in direction D1 to move the valve head 56A towards the plenum 42 and towards the valve seat 52A to counteract a force generated by the biasing member 57. Cutting power to the coil 59A allows the biasing member 57 to move the valve member 56 in the open position. A power to the coil 59A may be tuned such that a distance between the valve head 56A and the valve seat 52A may be selected to vary a flow circulating area of the valve 50 to vary a mass flow rate of the air flowing through the valve 50. With this configuration, all of the valves 50 may be opened or closed individually.

Figure 6:
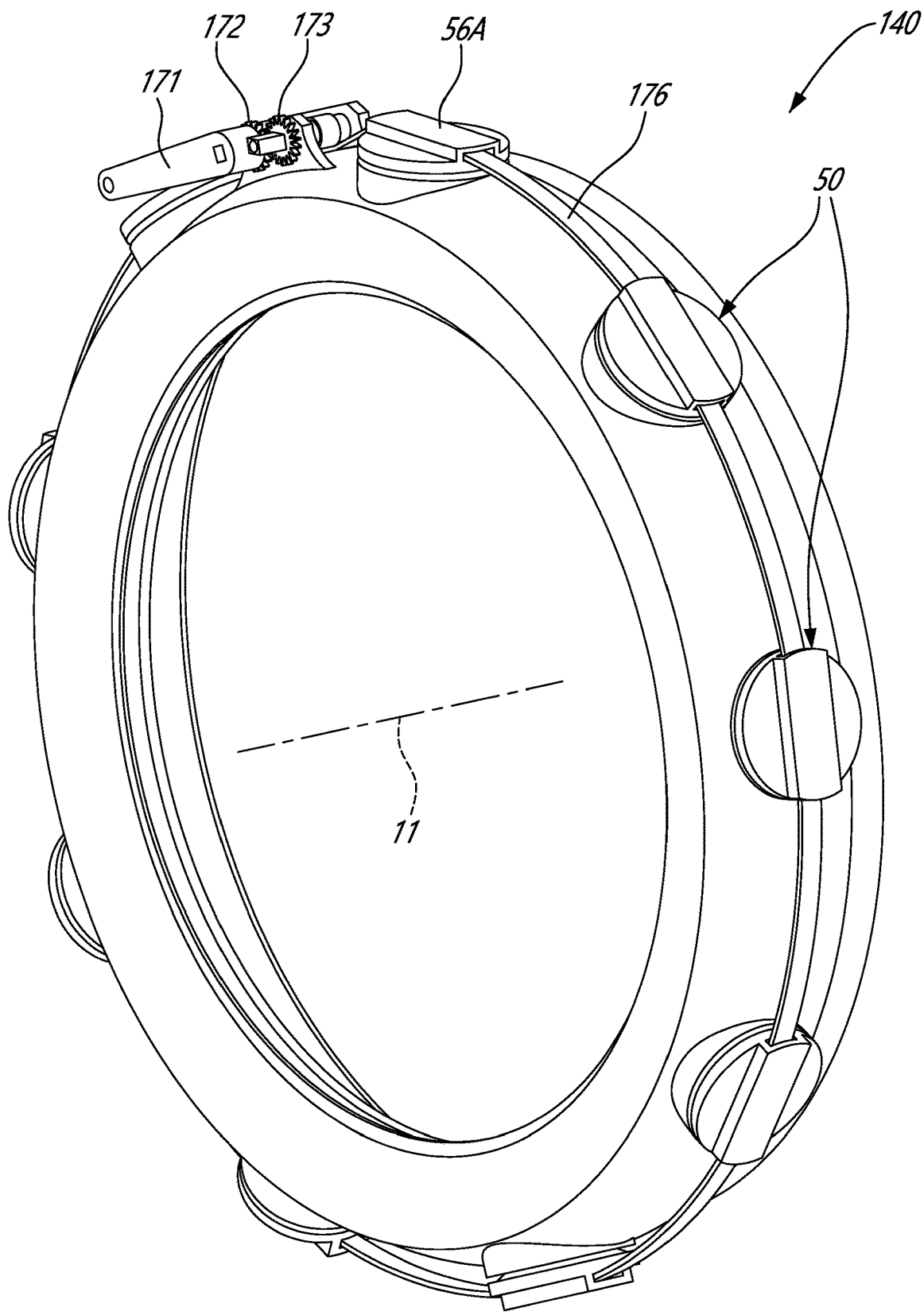
FIG. 6 is a three dimensional view of a bleed valve assembly in accordance with another embodiment for the compressor of FIG. 2.
Figure 7:
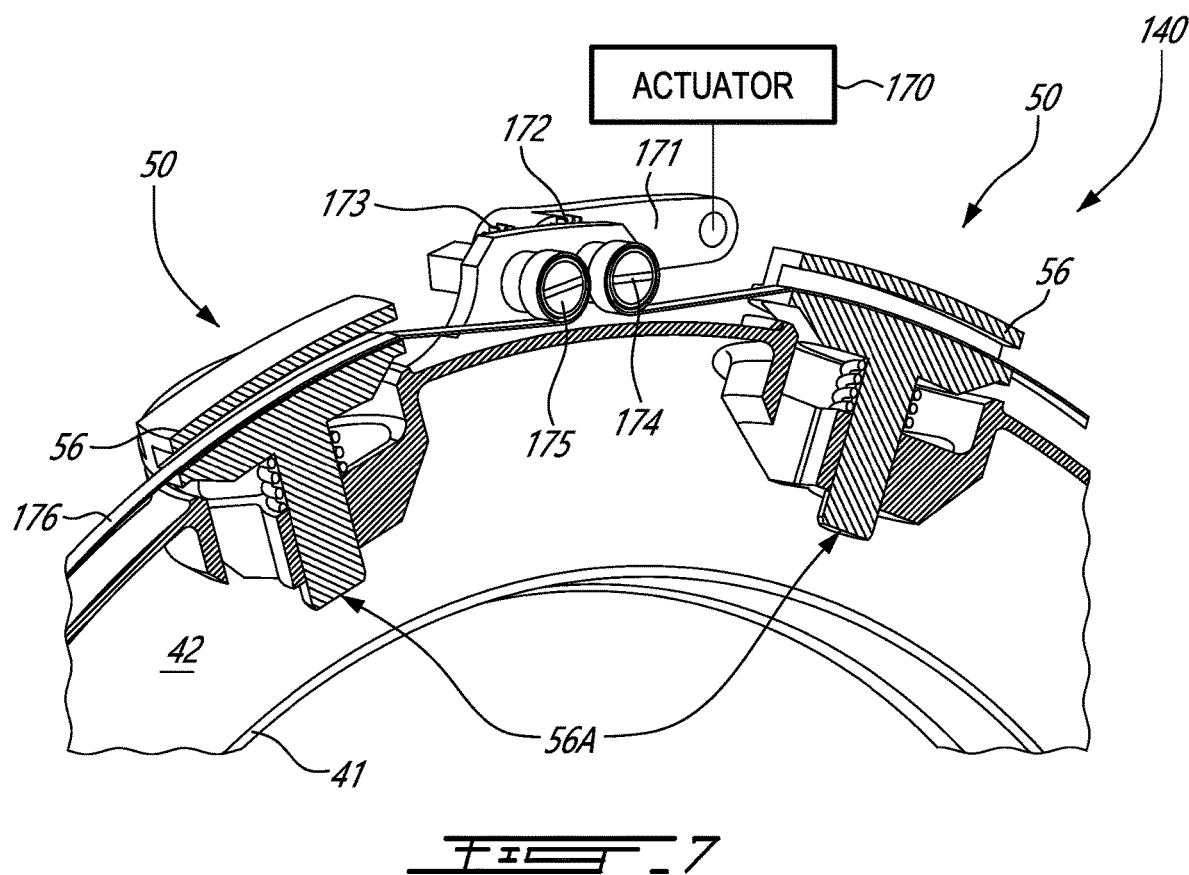
FIG. 7 is a cutaway view of the bleed valve assembly of FIG. 6 taken on a plane normal to the central axis of the gas turbine engine of FIG. 1.
Figure 8:
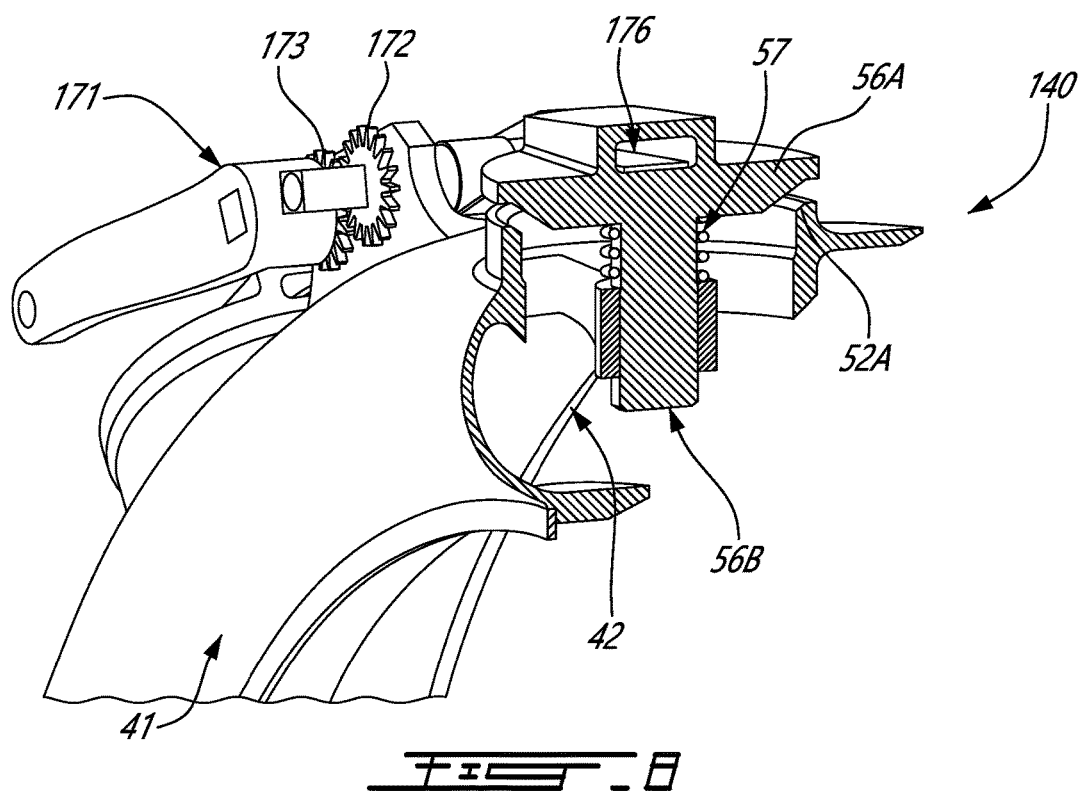
FIG. 8 is a cutaway view of the bleed valve assembly of FIG. 6 taken on a plane containing the central axis of the gas turbine engine of FIG. 1.

Referring to FIG. 6, another embodiment of a bleed valve assembly is shown at 140. For the sake of conciseness, only features differing from the bleed valve assembly 40 described above with references to FIGS. 3-5 are described below.

In the embodiment shown, the bleed valve assembly 140 includes an actuating system to conjointly move all of the valves 50 between their open and closed configurations. The actuating system of this embodiment includes an actuator 170 engaged to a lever 171. The lever 171 is engaged to a first gear 172. The first gear 172 is meshed with a second gear 173. The first gear 172 and the second gear 173 are rotatable about respective rotation axis that are parallel to one another. Rotation of the first gear 172 in one direction induces rotation of the second gear 173 in an opposite direction. The first gear 172 drives a first spool 174 and the second gear 173 drives a second spool 175. The first spool 174 and the second spool 175 may be coaxial with the first gear 172 and the second gear 173, but other configurations are contemplated. A band 176 is disposed around the annular case 41 and extends circumferentially around the central axis 11. The band 176 overlaps the valve heads 56A of the valve members 56 of the valves 50. The band 176 is located on the outer side of the annular case 41. The band 176 may be inserted through slots defined by the valve heads 56A.

Each of opposite end sections of the band 176 is wrapped around a respective one of the first spool 174 and the second spool 175. Powering the actuator 170, which is operatively connected to the controller 60, causes rotation of the lever 171 which, in turn, causes rotation of the first gear 172 and of the second gear 173. This therefore increases or decreases a tension in the band 176 to move the valve heads 56A radially inwardly towards the central axis 11. An increase in the tension of the band 176 moves the valve heads 56A towards the valve seats 52A. A decrease in the tension of the band 176 moves the valve heads 56A away from the valve seats 52A. Hence, the actuator 170 is engaged to the valve members 56 via the band 176, which overlaps the valve heads 56A. The actuator 170 is therefore configured to tighten or loosen the band 176 to selectively close or open the valves 50, respectively. With this configuration, all of the valves 50 are simultaneously opened or closed.

Other kind of actuators may be used. For instance, the actuator may be a motor drivingly engaged to one of the gears. Powering of the motor may induce rotation of the gears. The actuator may be a linear actuator having two ends each engaged to a respective end of the band 176. A tension in the band 176 may be varied by elongating and contracting the linear actuator. Other configurations are contemplated. In an alternate embodiment, one end of the band 176 may be fixed to the annular case 41.

The disclosed bleed valve assemblies may fit within a diameter of the impeller and have a low part count. They may offer the ability to change a bleed area as required. Each of the valves 50 may be identical to keep cost low.

Figure 9:
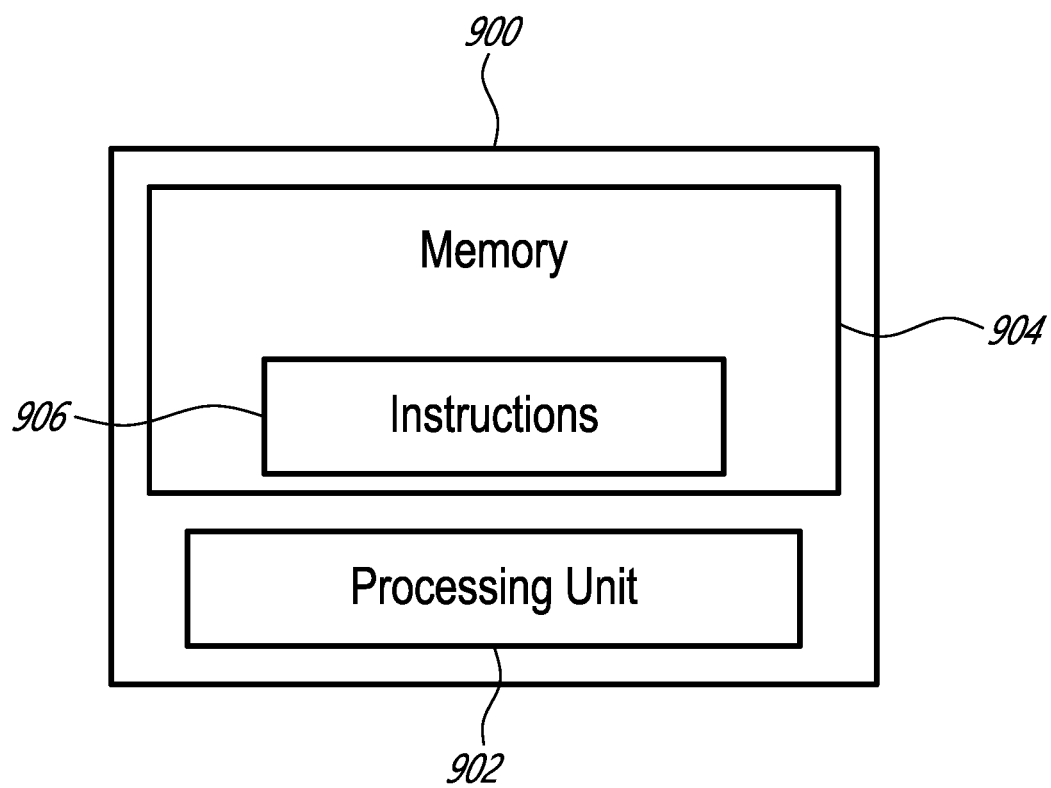
FIG. 9 is a schematic representation of a controller to be used with the bleed valve assembly.

With reference to FIG. 9, an example of a computing device 900 is illustrated. For simplicity only one computing device 900 is shown but the system may include more computing devices 900 operable to exchange data. The computing devices 900 may be the same or different types of devices. The controller 60 may be implemented with one or more computing devices 900. Note that the controller 60 can be implemented as part of a full-authority digital engine controls (FADEC) or other similar device, including electronic engine control (EEC), engine control unit (ECU), electronic propeller control, propeller control unit, and the like. In some embodiments, the controller 60 is implemented as a Flight Data Acquisition Storage and Transmission system, such as a FAST™ system. The controller 60 may be implemented in part in the FAST™ system and in part in the EEC. Other embodiments may also apply.

The computing device 900 comprises a processing unit 902 and a memory 904 which has stored therein computer-executable instructions 906. The processing unit 902 may comprise any suitable devices configured to implement the method of controlling the bleed air assembly such that instructions 906, when executed by the computing device 900 or other programmable apparatus, may cause the functions/acts/steps performed as part of the method of controlling the bleed air assembly as described herein to be executed. The processing unit 902 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 904 may comprise any suitable known or other machine-readable storage medium. The memory 904 may comprise non-transitory computer readable storage medium, for example, but not limited to, an electronic, magnetic, optical, electromagnetic, infrared, or semiconductor system, apparatus, or device, or any suitable combination of the foregoing. The memory 904 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 904 may comprise any storage means (e.g., devices) suitable for retrievably storing machine-readable instructions 906 executable by processing unit 902.

The methods and systems for controlling the bleed air assembly described herein may be implemented in a high level procedural or object oriented programming or scripting language, or a combination thereof, to communicate with or assist in the operation of a computer system, for example the computing device 900. Alternatively, the methods and systems for controlling the bleed air assembly may be implemented in assembly or machine language. The language may be a compiled or interpreted language. Program code for implementing the methods and systems for controlling the bleed air assembly may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems for controlling the bleed air assembly may also be considered to be implemented by way of a non-transitory computer-readable storage medium having a computer program stored thereon. The computer program may comprise computer-readable instructions which cause a computer, or more specifically the processing unit 902 of the computing device 900, to operate in a specific and predefined manner to perform the functions described herein, for example those described in the method 400.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

The term "connected" or "coupled to" may include both direct coupling (in which two elements that are coupled to each other contact each other) and indirect coupling (in which at least one additional element is located between the two elements).

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

It is noted that various connections are set forth between elements in the preceding description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. The term "connected" or "coupled to" may therefore include both direct coupling (in which two elements that are coupled to each other contact each other) and indirect coupling (in which at least one additional element is located between the two elements).

It is further noted that various method or process steps for embodiments of the present disclosure are described in the following description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Furthermore, no element, component, or method step in the present disclosure is intended to be dedicated to the public regardless of whether the element, component, or method step is explicitly recited in the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. The use of the indefinite article "a" as used herein with reference to a particular element is intended to encompass "one or more" such elements, and similarly the use of the definite article "the" in reference to a particular element is not intended to exclude the possibility that multiple of such elements may be present.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A compressor for an aircraft engine, comprising:
   a rotor rotatable about a central axis;
   a shroud disposed around the rotor and surrounding a gaspath, the shroud having a internal side facing the rotor and an external side opposite the internal side, the shroud defining an air outlet extending through the shroud from the internal side to the external side;
   an annular case extending around the central axis and mounted to the external side of the shroud radially outward of the air outlet, the annular case enclosing a plenum fluidly connected to the gaspath within the shroud via the air outlet extending through the shroud, the annular case having an inner side facing the external side of the shroud and an outer side opposite the inner side, the annular case defining an aperture extending from the inner side to the outer side;
   a valve mounted to the annular case at the aperture, the valve having:
      a valve support secured to the annular case and defining a valve seat surrounding a bleed passage, the valve seat located on the outer side of the annular case, the valve support defining a guiding aperture, and
      a valve member having a valve head and a valve stem protruding from the valve head and slidably received within the guiding aperture, the valve member having a closed position and an open position, the valve head abutting the valve seat in the closed position and offset from the valve seat in the open position;
   an actuator engaged to the valve member, the actuator configured for moving the valve member between the closed position and the open position; and
   a biasing member disposed between the valve head and the valve support, the biasing member exerting a biasing force on the valve head to bias the valve head in the open position.

2. The compressor of claim 1, wherein the valve support includes an outer ring secured to a peripheral wall of the aperture and an inner ring secured to the outer ring via a rib, the bleed passage defined between the inner ring and the outer ring, the inner ring circumscribing the guiding aperture.

3. The compressor of claim 1, wherein the biasing member is disposed around the valve stem.

4. The compressor of claim 1, wherein the valve member moves away from the plenum from the closed position to the open position.

5. The compressor of claim 1, wherein the actuator is a solenoid including a coil extending around the valve stem.

6. The compressor of claim 5, wherein the valve support includes an inner ring defining the guiding aperture, the coil secured to the inner ring and disposed around the guiding aperture.

7. The compressor of claim 1, wherein the actuator is engaged to the valve member via a band, the band overlapping the valve head, the actuator configured to increase a tension in the band to move the valve head radially inwardly towards the central axis.

8. The compressor of claim 7, wherein opposite end sections of the band are wrapped around respective spools each engaged by a respective one of a first gear and a second gear meshed with the first gear, the actuator engaged to a lever driving the first gear to selectively tighten or loosen the band.

9. The compressor of claim 1, wherein the aperture includes a plurality of apertures circumferentially distributed around the central axis, the valve including a plurality of valves each secured to the annular case at a respective one of the plurality of apertures.

10. An aircraft engine, comprising:
a compressor having a rotor rotatable about a central axis and a shroud disposed around the rotor, the shroud having an internal side facing the rotor and an external side opposite the internal side, the shroud defining an air outlet extending through the shroud from the internal side to the external side; and
a bleed valve assembly having:
an annular case enclosing a plenum radially outward of the shroud, the plenum being fluidly connected to a gaspath of the aircraft engine via the air outlet, the annular case having an inner side facing the central axis and an outer side opposite the inner side, the annular case defining apertures extending from the inner side to the outer side; and
commonly-actuated valves mounted to the annular case at the aperture, the commonly-actuated valves having valve members and valve supports, the valve supports secured to the annular case and defining valve seats surrounding bleed passages, the valve seats located on the outer side of the annular case, the commonly-actuated valves having an open configuration in which the valve members are offset from the valve seats and a closed configuration in which the valve members abut the valve seats; and
an actuating system operatively connected to the commonly-actuated valves, the actuating system having a powered configuration to conjointly move all of the commonly-actuated valves from the open configuration towards the closed configuration, wherein the actuating system includes one of:
solenoids having coils extending around the valve members; and
an actuator engaged to the valve members via a band, the band overlapping the valve members, the actuator configured to increase a tension in the band to move the valve members radially inwardly towards the central axis.

11. The aircraft engine of claim 10, wherein the valve supports include outer rings secured to peripheral walls of the apertures and inner rings secured to the outer rings via ribs, the bleed passages defined between the inner rings and the outer rings.

12. The aircraft engine of claim 11, wherein the inner rings are circumscribing guiding apertures slidably receiving valve stems of the valve members.

13. The aircraft engine of claim 10, comprising biasing members disposed between valve heads of the valve members and the valve supports, the biasing members exerting biasing forces on the valve heads to bias the valve heads away from the valve seats.

14. The aircraft engine of claim 13, wherein the biasing members are disposed around valve stems of the valve members, the valve heads secured to the valve stems.

15. The aircraft engine of claim 10, wherein the valve members move away from the plenum from the closed configuration of the valves to the open configuration of the valves.

16. The aircraft engine of claim 12, wherein the coils are secured to the inner rings and disposed around the guiding apertures.

17. The aircraft engine of claim 10, wherein opposite end sections of the band are wrapped around respective spools each engaged by a respective one of a first gear and a second gear meshed with the first gear, the actuator engaged to a lever driving the first gear to selectively tighten or loosen the band.

* * * * *